May 2, 1939.  M. W. FREEMAN  2,156,530
PROTECTIVE COVERING
Filed July 20, 1936
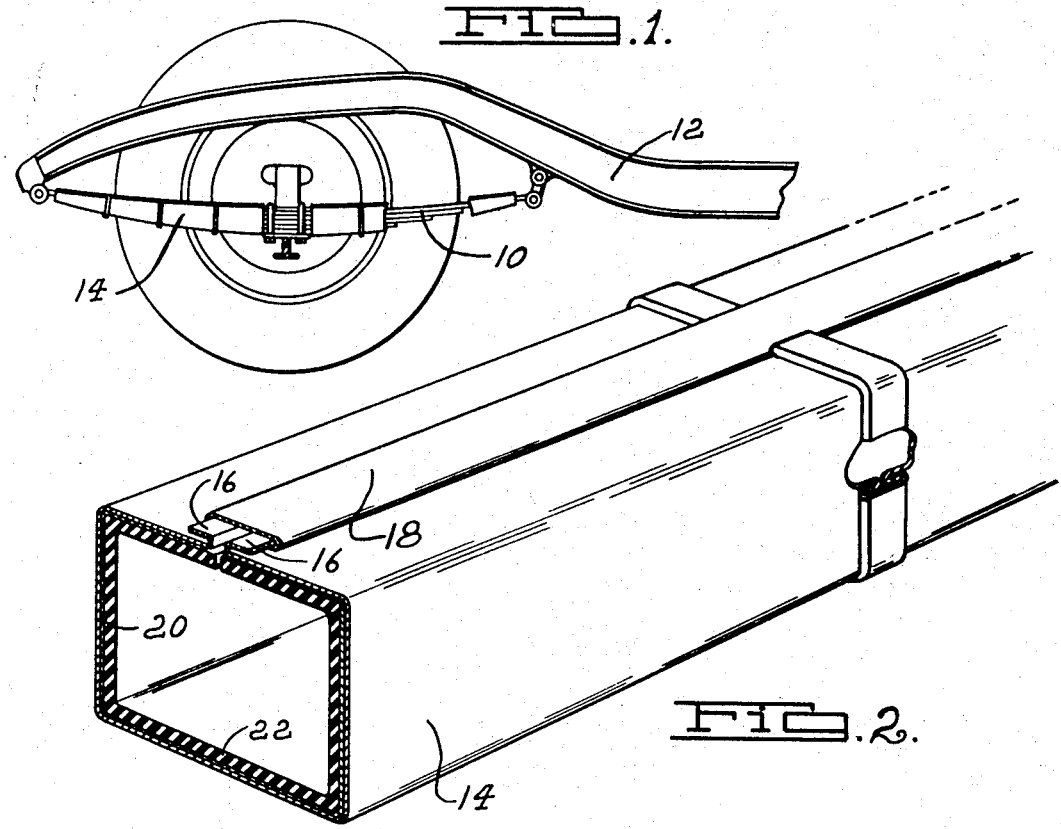
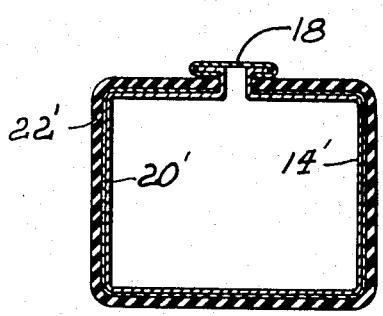
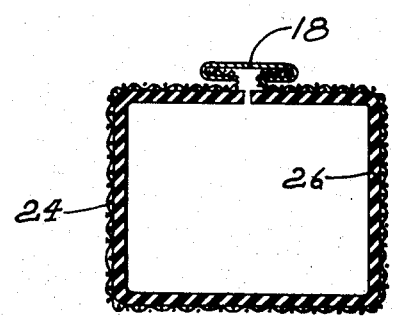
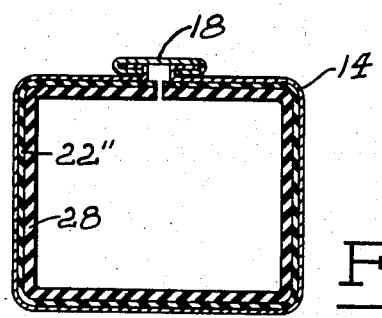
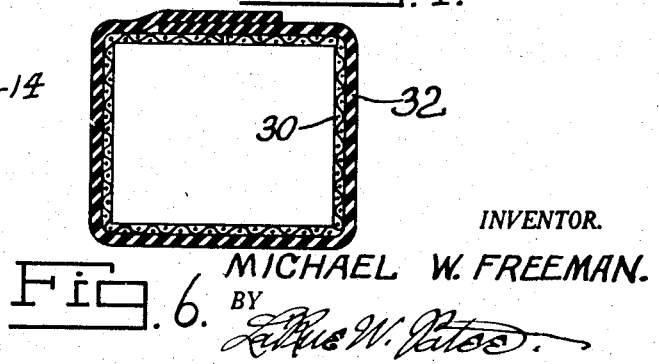
INVENTOR.
MICHAEL W. FREEMAN.
BY
ATTORNEY.

Patented May 2, 1939

2,156,530

UNITED STATES PATENT OFFICE 2,156,530

PROTECTIVE COVERING

Michael W. Freeman, Detroit, Mich.

Application July 20, 1936, Serial No. 91,517

5 Claims. (Cl. 267—37)

This invention relates to a sealing means and more particularly to a flexible protective covering for a flexible or resilient member and more particularly adapted for use on multiple leaf springs for an automobile chassis.

One of the objects of the invention is to provide an elastic protective coating on a flexible body portion which is adapted to retain a suitable lubricant within the covering and to exclude foreign matter therefrom.

Another object of the invention is to provide in connection with a flexible portion a suitable elastic coating by dipping or spraying either the flexible member or a metallic cover over the flexible member and forming a bond between the adjacent surfaces of the coating and flexible portion or between the adjacent surfaces of the coating and the metallic cover.

Other objects and advantages of the invention will be more apparent from the following description taken in connection with the accompanying drawing, in which:

Fig. 1 is a side elevational view of a portion of an automobile chassis illustrating my improved protective covering as applied to a multiple leaf spring.

Fig. 2 is a perspective view of my covering with an end in section showing my improved covering applied to the inner surface of metallic sections forming the flexible cover.

Fig. 3 is a transverse sectional view showing a modified form in which the covering is applied to the outer surface of the cover.

Fig. 4 is a transverse sectional view showing another modification in which a foraminous body is used with the covering applied thereto.

Fig. 5 is a transverse sectional view showing a further modification in which two protective coverings are applied to the cover.

Fig. 6 is a transverse sectional view showing another modification in which the edges of the protective covering overlap.

As an illustrative embodiment of the invention I have shown in Fig. 1 my improved covering as used in connection with a multiple leaf spring 10 for an automobile chassis 12 in which construction the invention has particular advantages.

In general practice it is customary to utilize a spring cover 14 of metal having a plurality of sections, joined together and enveloping the spring, or such covering may be a composition possessing sufficient resiliency to flex with the spring. Such covers have an internal surface which is designed to retain an initial supply of lubricant in contact with the spring surfaces and have consisted of cloth or other suitable material which initially or subsequently became impregnated with the lubricant. These inner coverings for retaining the lubricant have been found unsatisfactory for certain reasons among which are that wear due to flexing of the spring or an initial over-supply of lubricant have permitted the latter to escape from the covering to the external surface and consequently the spring becomes noisy due to lack of lubrication. In constructions where a lubricant retainer is bonded or otherwise secured to the spring servicing of the latter cannot be had without destruction of the retainer.

My improved lubricant seal or retainer has been found to overcome many of the difficulties encountered with such prior constructions in that the seal is impervious to lubricant, excludes any foreign matter from the spring which might otherwise enter through the cover, especially where the cover is of metallic construction, and is more durable and longer lived.

I have found that an improved elastic covering, preferably one which is impervious to lubricant, may be formed integral with the cover proper either where such cover is an integral structure or is composed of a plurality of sections, and such covering may be formed in thin sheets and cut in strips corresponding to and applied to each of several sections completing the outer covering.

An improved covering has been found particularly adaptable for use in connection with a covering formed of perforated metal or heavy wire screen in order to materially reduce the cost of such cover over one of solid construction. Where a perforated outer cover is utilized the protective covering may be advantageously applied by successive dipping operations to give the requisite thickness.

The composition of the covering will depend to a large extent on the character of the outer cover employed and whether the covering is to unite with the cover by bonding or vulcanization. As an example of the composition, it may consist of a rubber base, an accelerator, such as captax, a vulcanizing agent such as sulphur, a suitable oxidization retarding agent which may be agerite powder, an agent facilitating adhesion such as carbon, and salts of fatty acids of high molecular weight which may be referred to as stearic acid. More specifically, the composition is as follows:

| | Parts |
|---|---|
| Rubber | 100 |
| Zinc oxide | 5 |
| Stearic acid | 4 |
| Captax | 1 |
| Sulphur | 5 |
| Agerite powder | 1 |
| Carbon | 40 |

The above composition should be cured in proper form for approximately twenty minutes under approximately forty pounds' pressure. The internal surface of the cover should be suitably plated, as with brass, before application of the elastic covering.

It will be understood that while the foregoing composition is one embodiment of a suitable composition, that such composition may be altered by substitution of other well known agents; and that if desired a suitable composition having a substantial quantity of a composition of latex or gums may be applied to the internal surface of the cover by spraying or dipping and thereafter a soft rubber composition having a fairly low sulphur content may be applied to the composition of latex covering and the two coverings then properly cured in one and the same operation.

Referring more specifically to the drawing wherein I have shown one embodiment of my invention and referring particularly to Fig. 2, a spring cover is illustrated at 14 composed of a plurality of sections arranged in end to end relation and joined by an interlocking of the adjacent ends. Each section is split longitudinally with its adjacent edges flanged as at 16 to receive a clamping or interlocking member 18 which holds the edges together when the cover is assembled on a spring. As shown in Fig. 2, 20 illustrates a copper plating applied to the inner surface of the several sections and to this surface I have applied the rubber composition 22. It will be understood that various methods other than the copper plating may be used to prepare the metal for receiving the elastic coating.

If desired the covering may be applied to the outer surface of the several sections, preferably by bonding as illustrated in Fig. 3. The copper plating is shown at 20' and the covering at 22'. It is to be understood that in place of the sections 14' a perforated body portion may be used or it may be formed from a metallic mesh member 24, as shown in Fig. 4. When the latter is used the composition 26 may be embedded in the body portion so that the inner and outer surfaces have a finished appearance.

Where it is desired to obtain a relatively soft covering sponge rubber 28 may be applied to the surface of the composition covering 22", shown in Fig. 5.

As shown in Fig. 6, the metallic body 30 is formed to have its opposite edges abut when wrapped over a spring and the covering 32 may be formed as an integral part thereof or may be wrapped around the body 30 and separate therefrom. In either event the opposite edges of the cover are extended beyond the edges of the body to overlap when applied to the spring It is to be understood that the cover may be internal or external of the body 30 and that the latter may be metallic mesh, as shown, or sheet metal, as shown in Figs. 2, 3 and 5.

It will be understod that various changes, including the composition of the elastic material, may be made without departing from the spirit of my invention, and it is not my intention to limit its scope other than by the terms of the appended claims.

What I claim is:

1. A flexible protective covering having a metallic body portion and an elastic material bonded to the surface of said body portion.

2. A flexible spring covering comprising a plurality of metallic short sections arranged end to end and joined together at their adjacent ends to form a rectangular section extending longitudinally of a multiple leaf spring, and an elastic coating on the inner surface of said cover and bonded thereto.

3. A spring covering comprising a metallic body portion embracing the four sides of a multiple leaf spring and an impervious covering bonded to a surface of said body portion to form a seal around the spring.

4. A spring cover comprising a metallic covering surrounding the four sides of a multiple leaf spring for automobiles, a protective covering of rubber vulcanized to the inner surface of said covering, and a sponge rubber coating bonded to the inner surface of said rubber coating.

5. A spring cover comprising a metallic cover member surrounding the four sides of a multiple leaf spring for automobiles, and a protective coating of elastic composition secured to said metallic base.

MICHAEL W. FREEMAN.